W. P. ANTHONY.
CLOTH EXPANDER.
APPLICATION FILED NOV. 10, 1914.
1,186,643.
Patented June 13, 1916.
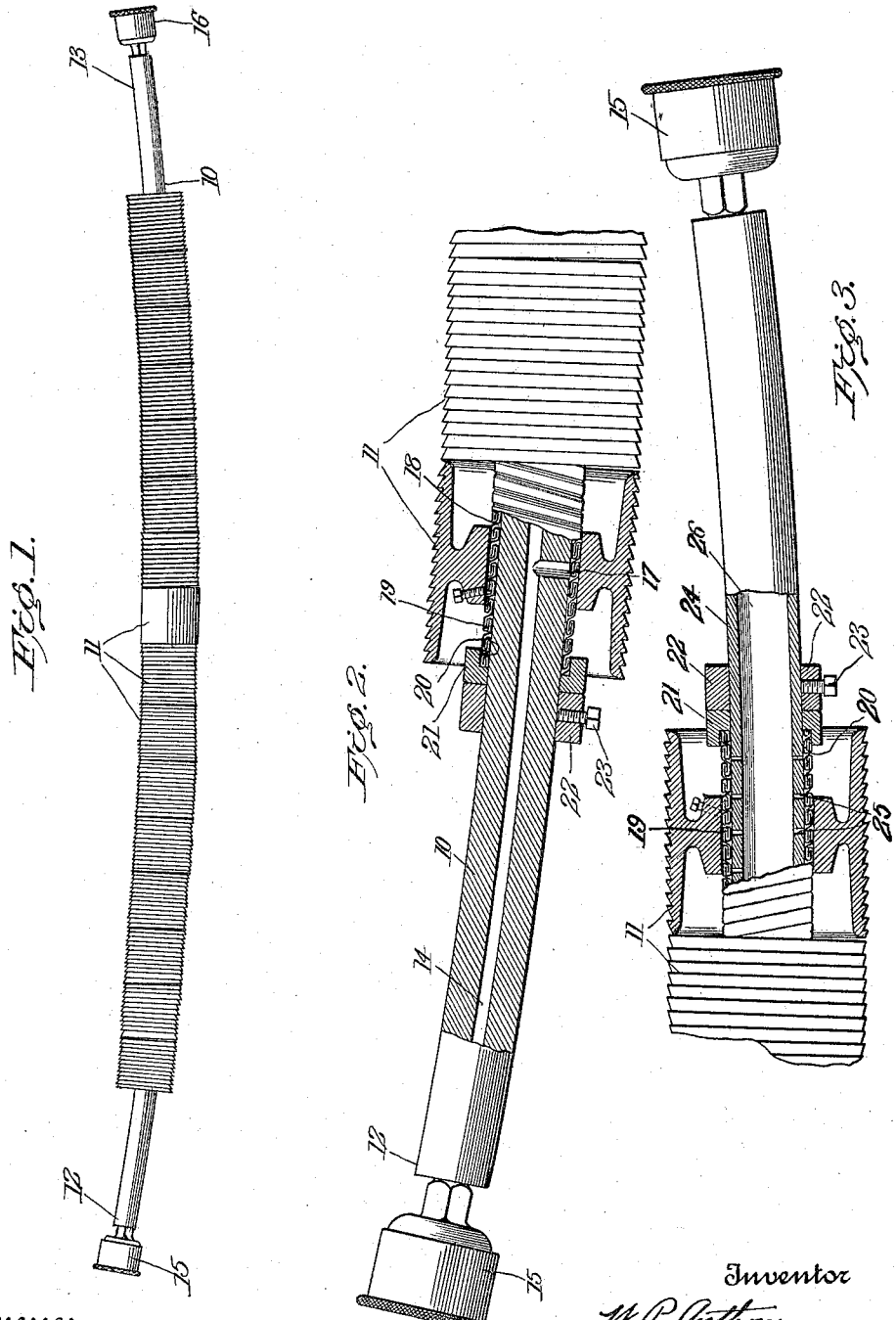

UNITED STATES PATENT OFFICE.

WENDELL P. ANTHONY, OF RIDLEY PARK, PENNSYLVANIA, ASSIGNOR TO THE EDDYSTONE MANUFACTURING COMPANY, OF PHILADELPHIA, PENNSYLVANIA, A CORPORATION OF PENNSYLVANIA.

CLOTH-EXPANDER.

1,186,643.   Specification of Letters Patent.   Patented June 13, 1916.

Application filed November 10, 1914. Serial No. 871,422.

*To all whom it may concern:*

Be it known that I, WENDELL P. ANTHONY, a citizen of the United States, and resident of Ridley Park, Delaware county, State of Pennsylvania, have invented certain new and useful Improvements in Cloth-Expanders, of which the following is a specification.

My invention relates to cloth expanders which are used in apparatus for expanding or stretching a web of cloth in the direction of its width.

The expander is usually built up of a plurality of interlocking rollers which are rotatably supported by a curved bar or rod mounted in the frame of the machine. Numerous devices have been employed to lubricate the bearing surfaces between the rollers and the curved rod but most of them have been found to be unsatisfactory.

The principal object of my invention therefore is to generally improve the construction of cloth expanders so that they will be properly lubricated, and so that the lubricant used will not escape from the expander and onto the goods.

The above and other objects and the novel features of my invention will be apparent from the following description taken in connection with the drawing, in which, Figure 1 is a side elevation of a cloth expander embodying my invention; Fig. 2 is an enlarged detail view of one end of the expander showing parts in section; and Fig. 3 is an enlarged detail view of one end of another expander embodying my invention, parts thereof being shown in section.

The complete expander as illustrated in Fig. 1 is employed in a machine for stretching or spreading a web of cloth or other similar material transversely of its length. The expander comprises a curved bar 10 which has a plurality of corrugated or toothed rollers or cylindrical expander sections 11 strung thereon and disposed intermediate the ends 12 and 13 of the bar. The ends 12 and 13 are suitably supported in the frame of a machine. The rollers 11 thereof may or may not be provided with interlocking means so that they may rotate together or independently as desired. The bar 10 is round or circular in cross section and has a central passageway 14 extending longitudinally thereof from end to end. The pressure grease cups 15 and 16 are secured to the opposite ends of the bar 10 in a position so that their outlets will feed into the passageway 14. At intervals along the part of the bar 10 which supports the rollers 11 there are lateral passageways 17 which deliver the grease or lubricant from the central or main passageway 14 to the outer bearing surface 18 of the bar 10.

In order to confine the lubricant to the bearing surface 18 I provide a flexible spiral metal tube 19 which surrounds the portion of the bar 10 which carries the rollers 11. The ends of the spiral tube 19 extend into recesses 20 in the cup-shaped collars 21 which are carried loosely on the bar 10 and are prevented from moving longitudinally of the bar by collars 22 keyed to the bar by the set screw 23. The recesses 20 may be suitably packed to prevent the escape of the lubricant at that point. The rollers 11 are fixed to the spiral tube 19 and rotate therewith about the bar 10. The spiral tube 19 is oil-tight and will prevent the escape of the lubricant from the bearing surface 18. The tube 19 being made in the form of a spiral has grooves extending spirally thereof which will feed the lubricant issuing from the passageways 17, longitudinally of the bar 10 and cover and properly lubricate the bearing surfaces.

In Fig. 3 I have illustrated a slightly different form of the invention in which the curved bars for supporting the rollers are made of heavy tubing 24 and provided with lateral distributing outlets 25 at intervals in the length thereof. The construction of that device is otherwise the same as the one shown in Figs. 1 and 2. The construction shown in Fig. 3 has the advantage that the central passageway 26 thereof is already provided for in the tubular body and is therefore a more inexpensive construction than the expander shown in Fig. 2.

The operation of the device will be understood from the foregoing description. The compression grease cups at the ends of the tubes will force the lubricant into the central passageway and out to the bearing surfaces through the lateral passageways. The flexible tubing being oil-tight will not permit the lubricant to get into contact with the goods and yet on account of its spiral construction will carry or distribute the lubricant throughout the length of the bearing surface of the bar.

While I have shown and described the embodiment of my invention in detail I do not wish to be limited to the exact constructions illustrated as it is evident that they may be varied without departing from the spirit of the invention.

Having thus described the invention, what is claimed and desired to be secured by Letters Patent is:

1. A cloth expander comprising the combination of a fixed supporting member, a flexible oil-tight tube fitting said member and rotatable thereon, means for feeding a lubricant to the bearing surface of said supporting member, and a plurality of cylindrical expander sections mounted on said tube.

2. A cloth expander comprising the combination of a supporting member having a bearing surface, cloth expanding means rotatably mounted on said member, means for delivering lubricant to said bearing surface, and means for distributing the lubricant over said bearing surface and for confining the lubricant to said bearing surface.

3. A cloth expander comprising a curved supporting member having a passageway extending longitudinally thereof from end to end and lateral outlets from said passageway to the supporting surface of said member, a flexible oil-tight tube fitting the bearing surface of said member, and cloth expanding means carried by said flexible tube and rotatable therewith.

4. A cloth expander comprising the combination of a fixed tubular curved member having lateral outlets from the interior thereof to the bearing surface of said member, means at the ends of said member capable of delivering a lubricant to the interior thereof and through said lateral outlets to the bearing surface, a spiral flexible tube fitting said member and covering the bearing surface thereof, said spiral tube being adapted to distribute the lubricant over the bearing surface of said member, means for limiting the longitudinal movement of said tube, and a plurality of expander sections carried by said flexible tube.

5. A cloth expander comprising the combination of rotatable cloth expanding means, a supporting member therefor having a longitudinally extending oil conduit provided with outlets at points along the outer bearing surface thereof, and an oil-tight tube carrying said cloth expanding means and rotatable therewith and surrounding the parts of said supporting member having the outlets therein so as to confine the oil or lubricant on the outer bearing surface of said supporting member.

6. A cloth expander comprising a supporting member circular in cross section and having a lubricant passageway extending longitudinally thereof, said passageway being provided with outlets leading to the bearing surface of said supporting member, a lubricant container at the end of said member and adapted to feed lubricant to said passageway, a tubular member mounted on said supporting member over the outlets in the latter and adapted to confine the lubricant to the bearing surface thereof, and cloth expanding means mounted on said tubular member and rotatable with the latter on the supporting member.

7. The combination with a supporting member having a bearing surface, of means for delivering lubricant to said bearing surface, and means for distributing the lubricant along the bearing surface and also confining the lubricant to the bearing surface, comprising a lubricant-tight tube surrounding said supporting member and provided with a spiral groove next to the bearing surface and means closing the ends of the tube and adapted to contain packing material.

In testimony whereof I affix my signature in presence of two witnesses.

WENDELL P. ANTHONY.

Witnesses:
  C. C. JÖRGENSEN,
  BENJ. WEIR, Jr.

Copies of this patent may be obtained for five cents each, by addressing the "Commissioner of Patents, Washington, D. C."